United States Patent [19]

de Zwart

[11] 4,447,132

[45] May 8, 1984

[54] LIQUID CRYSTAL DISPLAY DEVICE

[75] Inventor: Maarten de Zwart, Eindhoven, Netherlands

[73] Assignee: U.S. Philips Corporation, New York, N.Y.

[21] Appl. No.: 244,543

[22] Filed: Mar. 17, 1981

[30] Foreign Application Priority Data

Mar. 17, 1980 [NL] Netherlands .......................... 8001556

[51] Int. Cl.³ .............................................. G02F 1/137
[52] U.S. Cl. ..................... 350/346; 350/330
[58] Field of Search ................ 350/346, 350 R, 350 S, 350/330; 252/299.2, 299.6

[56] References Cited

U.S. PATENT DOCUMENTS

| | | | |
|---|---|---|---|
| 3,915,883 | 10/1975 | Vanmeter et al. ............... | 350/350 R |
| 3,953,491 | 4/1976 | Steinstrasser et al. ........ | 252/299.2 X |
| 4,009,934 | 3/1977 | Goodwin et al. ............ | 252/299.2 X |
| 4,083,797 | 4/1978 | Oh .................................... | 350/350 S X |
| 4,105,298 | 4/1977 | Levine et al. ........................ | 350/346 |
| 4,212,762 | 7/1980 | Dubois et al. ............... | 350/350 S X |
| 4,230,596 | 10/1980 | Beguin .......................... | 350/350 R X |
| 4,235,736 | 11/1980 | Beguin .......................... | 350/350 R X |
| 4,257,911 | 3/1981 | Gray et al. .................... | 350/350 S X |
| 4,293,193 | 10/1981 | Labes et al. ...................... | 350/350 R |
| 4,293,434 | 10/1981 | Deutscher et al. ......... | 350/350 R X |
| 4,323,472 | 4/1982 | Sethofer ...................... | 350/350 R X |

OTHER PUBLICATIONS

Green et al., "Nematic Heterocyclic Diesters", *IBM Technical Disclosure Bulletin,* vol. 15, No. 8, Jan. 1973.
Haller et al., "Retarding Crystallization of Supercooled Nematic Liquid Crystals", *IBM Technical Disclosure Bulletin,* vol. 16, No. 1, Jun. 1973.
Tani et al., "Storage-Type Liquid-Crystal Matrix Display", *Proceedings of the SID,* vol. 21/2, 1980.
Creagh, "Nematic Liquid Crystal Materials for Displays", Proceedings of the IEEE, vol. 16, No. 7, Jul. 1973.
Goodwin, et al., "Electro-Optic Display Devices and Methods", *Research Disclosure,* Industrial Opportunities Ltd., Mar. 1975, pp. 28–31.
Freiser et al., "Mixture of Positive and Negative Anisotropy Nematics", *IBM Technical Disclosure Bulletin,* Oct. 1974, vol. 17, No. 5, pp. 1498–1501.

*Primary Examiner*—John K. Corbin
*Assistant Examiner*—David Lewis
*Attorney, Agent, or Firm*—Paul R. Miller

[57] ABSTRACT

In a matrix display device having a cholesteric liquid crystal the bistability effect is used which some cholesteric liquid crystals show. The liquid crystal shows a frequency-dependent relaxation of a positive to a negative dielectric anisotropy. After writing the information the light-scattering picture elements have a focal-conical texture and the transparent elements have a homeotropic-nematic texture. The information can be stored for a longer period of time by causing the homeotropic-nematic texture of the transparent elements to change into the substantially transparent planar-conical texture. This is produced rapidly by applying across all picture elements a voltage of a frequency at which the liquid crystal has a negative dielectric anisotropy. The focal-conical texture of the light-scattering elements is substantially not disturbed by this voltage. During the presence of this voltage the written information is continuously visible.

8 Claims, 5 Drawing Figures

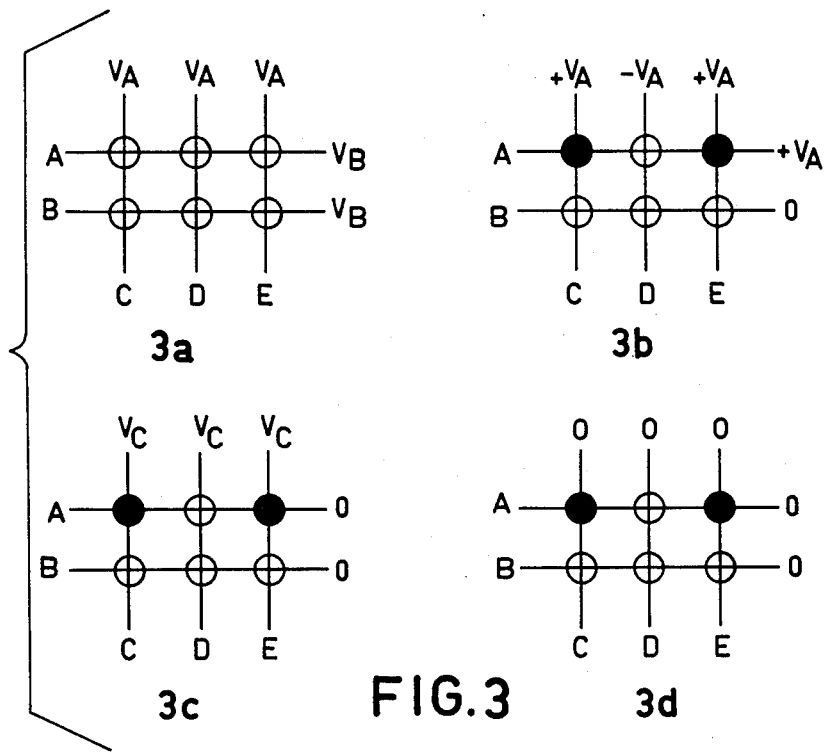
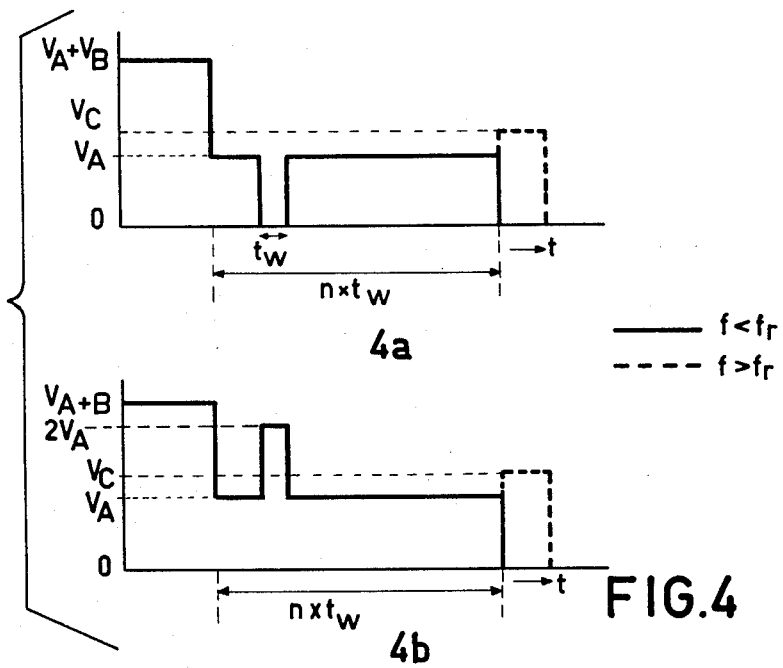
FIG.3
FIG.4

LIQUID CRYSTAL DISPLAY DEVICE

The invention relates to a display device comprising two parallel supporting plates, patterns of strip-shaped electrodes crossing each other on the facing surfaces of the supporting plates and a layer of cholesteric liquid crystal having positive dielectric anisotropy between the supporting plates, which layer of liquid crystal has a substantially transparent planar-conical texture or a light scattering focal-conical texture below a certain field strength $E_1$, has a transparent homeotropic-nematic texture above a certain field strength $E_2$ and has a light-scattering focal-conical texture or a transparent homeotropic-nematic texture for field strengths between $E_1$ and $E_2$.

A cholesteric liquid crystal is to be understood to mean herein a nematic liquid crystal to which a certain quantity of cholesteric liquid crystal has been added and which mixture has a cholesteric texture.

Such a display device is known from the article "Speichereffekte in cholesterinischen Flüssigkeiten mit positiver DK-anisotropie" from Berichte der Bunsen-Gesellschaft 78, No. 9, 1974, pp. 912–914. In this article the bistability effect is used which some cholesteric liquid crystals show, which effect will now first be explained. There is started from a substantially transparent planar-conical cholesteric texture in which the axes of the helices are perpendicular to the surfaces of the supporting plates. Above a certain threshold value $E_{th}$ of the field strength, the substantially transparent planar-conical cholesteric texture changes into a light-scattering focal-conical texture in which the axes of the helices extend parallel to the surfaces of the supporting plates. When the field strength increases, the helices unwind and when the orientation of the liquid crystal molecules is perpendicular to the surfaces of the supporting plates the light-scattering focal-conical texture above a field strength $E_2$ changes into a transparent homeotropic-nematic texture. As a result of the hysteresis in the transmission versus field strength characteristic, the transparent homeotropic-nematic texture changes into the light-scattering focal-conical texture again only at a field strength $E_1$ smaller than the field strength $E_2$.

In the matrix display device described in the above-mentioned article, this bistability effect is used as follows. The electrodes are provided on the supporting plates in the form of parallel strips. The electrodes on one supporting plate cross the electrodes on the other supporting plate. The electrodes on one supporting plate constitute the so-called rows and the electrodes on the other supporting plate constitute the so-called columns of the matrix. The picture elements are at the crossings of the row and column electrodes. As a result of a sufficiently high voltage across the electrodes which results in a field strength above $E_2$ across the liquid crystal layer, all picture elements of the matrix are brought into the transparent homeotropic-nematic texture. A voltage is then applied across all elements which results in a field strength $E_H$ between $E_1$ and $E_2$. The liquid crystal layer now has the property of remaining in the transparent homeotropic-nematic state for some time. The rows are driven successively and the information is written on the columns per row. For the elements which are to change into the scattering condition, the voltage is made zero until the homeotropic-nematic texture changes into the focal-conical texture. The remaining elements of a row during writing are kept at a voltge which results in a field strength larger than or equal to $E_H$ and consequently remain in the transparent homeotropic-nematic texture. A voltage which results in a field strength $E_H$ across the liquid crystal layer is then applied again across all elements of a row.

During the time that a transparent homeotropic-nematic condition of a line remains stable, other lines can be driven. The stability of the transparent homeotropic-nematic texture at a field strength $E_H$, however, is restricted in that the surrounding of the picture element is in the focal-conical condition. The focal-conical texture in fact has the property of growing into the homeotropic-nematic texture, which results in disturbing light-scattering effects. As a result of this, the number of lines which can be written is restricted and a repeated writing of the information is necessary due to the restricted memory time of the display device being also restricted thereby. For applications, such as alpha-numeric display devices, in which the information should be stored for a long time, such a matrix display device is therefore less suitable.

It is also known from the above-mentioned article that, if after writing the voltage across the picture elements is made zero very rapidly, the picture elements which are in the metastable transparent homeotropic-nematic condition very rapidly change into the stable substantially transparent planar-conical condition. However, this rapid change occurs only in cholesteric liquid crystals having a small concentration of cholesteric material, i.e. when the concentration of cholesteric material is such that the ratio of the layer thickness d of the liquid crystal layer and the pitch p of the planar-conical texture is not larger than substantially $d/p=5$. However, this has for its disadvantage that in the field-free condition the light-scattering focal-conical memory state returns comparatively rapidly to the transparent planar-conical texture, which means a restriction of the memory time.

The memory time increases exponentially with d/p, so that an increase of the concentration of the cholesteric material means an increase of the memory time. In this case, however, the rapid change from the metastable transparent homeotropic-nematic condition to the stable substantially transparent planar-conical condition does not occur. The transparent homeotropic-nematic condition first changes rapidly into a light-scattering focal-conical intermediate condition to then change only slowly into the substantially transparent planar-conical texture. During this change the written information is poorly visible or is not visible at all, which makes the display device unfit for practical applications.

It is therefore the object of the invention to provide a display device which has a long memory time and of which the information after writing is continuously visible.

For that purpose, a display device of the kind mentioned in the opening paragraph is characterized according to the invention in that above a certain critical frequency of the electric field the layer of cholesteric liquid crystal has a negative dielectric anisotropy and that an electric field having a frequency above the critical frequency is applied across the layer of cholesteric liquid crystal so as to cause the transparent homeotropic-nematic texture to change into a transparent planar-nematic texture and then to produce a substantially transparent planar-conical texture of the layer of cholesterictic liquid crystal.

The invention is based on the following recognition. Prior to writing the information, all picture elements are brought into the transparent homeotropic-nematic condition by means of a field having a field strength above $E_2$ and a frequency below the critical frequency. A voltage is then applied across all elements which results in a field strength $E_H$ between $E_1$ and $E_2$. The picture elements of a driven row, which are to become light-scattering, are kept at a voltage zero for a given time so that the light-scattering focal-conical texture is formed. The voltage across said picture elements is then increased again in such manner that a field strength $E_H$ between $E_1$ and $E_2$ is formed across the picture elements in which the light-scattering focal-conical structure remains. The remaining picture elements of a driven row during writing are kept in the transparent homeotropic-nematic condition at a field strength equal to or larger than $E_H$. After all the rows have been written in this manner, a field having a frequency above the critical frequency is applied across all picture elements, above which frequency the cholesteric liquid crystal has a negative dielectric anisotropy. As a result of this, the homeotropic-nematic texture of the transparent picture elements changes into a planar-nematic texture. During the presence of this field, a spontaneous winding of helices will take place of the elements which are in the planar-nematic condition. After switching of the field, the texture changes into the substantially transparent planar-conical texture. With these changes the information remains visible continuously. The value and the duration of the field having a frequency above the critical frequency are such that the focal-conical texture of the light-scattering elements is substantially not disturbed. In addition, because the change from the transparent homeotropic-nematic condition to the light-scattering focal-conical intermediate condition does not occur, a larger concentration of cholesteric material may be added to the liquid crystal. As a result of this, a longer memory time is obtained. It is to be noted that, although in the article on page 913 there is reference to a texture change by means of a liquid crystal the dielectric anisotropy of which above a certain critical frequency is negative, it relates in that case to a quite different field dependence of the liquid crystal. At very low concentrations of the cholesteric material in the liquid crystal mixture, the change-back from the homeotropic-nematic condition to the focal-conical condition does in fact no longer occur. The variation of the dielectric anisotropy is now used to still produce the change.

A further embodiment of a display device is characterized in that the cholesteric liquid crystal is composed of a nematic liquid crystal mixture comprising 50% by weight of 4-n-pentylphenyl 2-chloro-4-(4-n-pentyl-benzoyloxy) benzoate and 50% by weight of 4-n-octylphenyl-2-chloro-4-(4-n-heptylbenzoyloxy) benzoate, to which mixture 5% by weight of the cholesteric liquid crystal 4-cyano-4'-(2-methylbutyl)-bi-phenyl has been added. In general, liquid crystals of the cholesteric type may be used which show a relaxation of a positive to a negative dielectric anisotropy and the pitch of which is smaller than substantially one fifth of the layer thickness.

The invention will now be described in greater detail with reference to the accompanying drawing, of which:

FIG. 3 shows the driving of a display device in accordance with the invention, and FIGS. 4a and 4b show the variation of the voltage as a function of time across a light-scattering and transparent element, respectively.

Figure 1:
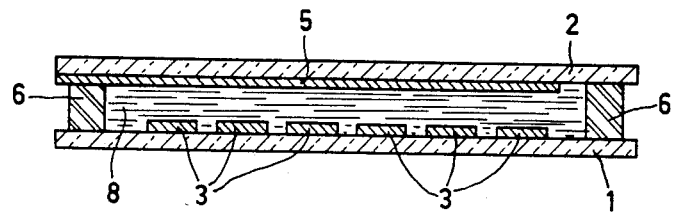
FIG. 1 is a sectional view of a display device according to the invention.

FIG. 1 is a diagrammatic sectional view of a display device according to the invention. The display device comprises two glass supporting plates 1 and 2. The supporting plate 1 has a pattern of strip-shaped electrodes 3 of indium oxide. The supporting plate 2 also has a pattern of strip-shaped electrodes 5 of indium oxide which cross the electrodes 3 substantially at right angles. In this manner the electrodes 3 form, for example, the rows and the electrodes 5 form the columns of a matrix of picture elements. The supporting plates 1 and 2 are kept at a distance of 10 $\mu$m from each other by a sealing rim 6 of polyethylene foil. In order to obtain a perpendicular orientation of the liquid crystal molecules at the interface of the supporting plates 1 and 2, the surfaces are treated, for example, with a solution of perfluorosilane in hexane. The layer of liquid crystal 8 is composed, for example, of a nematic liquid crystal mixture comprising 50% by weight of 4-n-pentylphenyl-2-chloro-4-(4-n-pentylbenzoyloxy) benzoate and 50% by weight of 4-n-octylphenyl-2-chloro-4-(4-n-heptylbenzoyloxy) benzoate, which substances are obtainable from Eastman Kodak, to which mixture 5% by weight of the cholesteric liquid crystal 4-cyano-4'-(2-methylbutyl)-biphenyl has been added, which substance is available from BDH Chemicals as CB 15. The critical frequency of this mixture at which a change from positive to negative dielectric anisotropy takes place lies at a frequency of 3200 Hz. This mixture shows a dielectric anisotropy of +5.9 at 50 Hz and a dielectric anisotropy of −2.4 at 30 kHz. These values have been measured at a temperature of 25° C.

Figure 2:
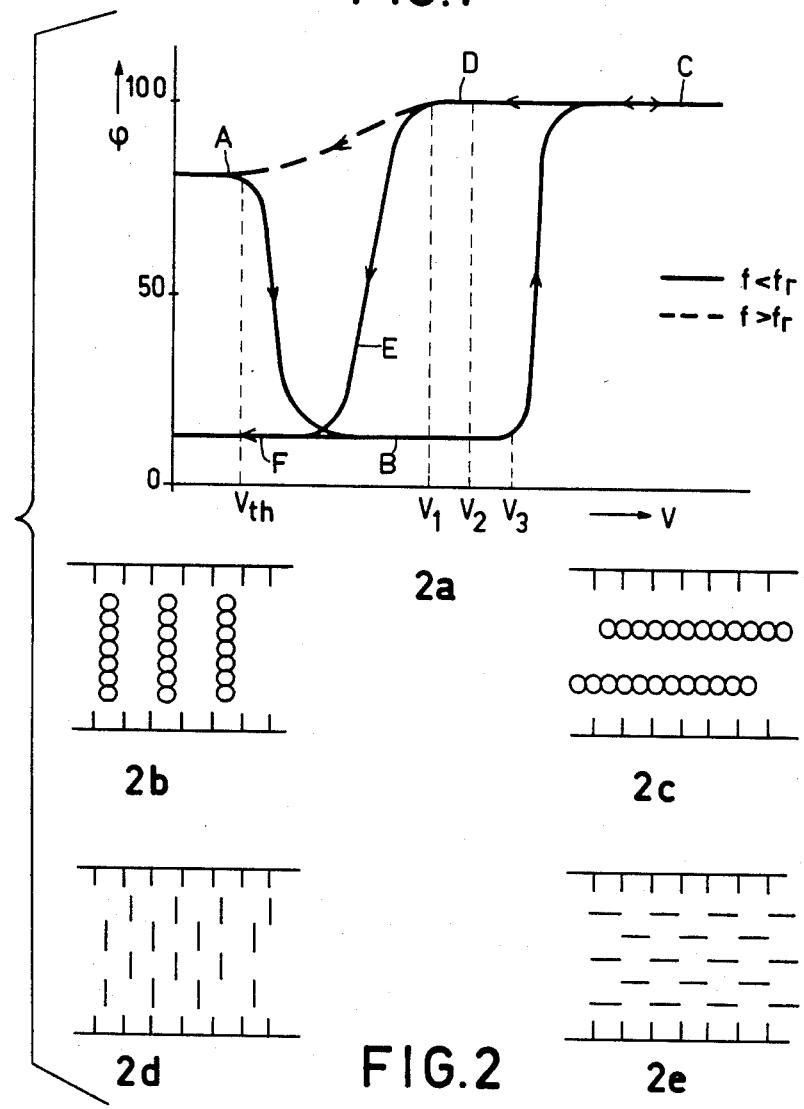
FIG. 2 shows the principle of operation of a display device in accordance with the invention.

The operating principle of a display device according to the invention will be explained with reference to FIG. 2. FIG. 2a shows a voltage (V) versus transmission ($\phi$) characteristic of the display device. There is started from a substantially transparent planar-conical texture A as shown diagrammatically in FIG. 2b. The longitudinal axes of the liquid crystal molecules at the surface of the supporting plates are oriented perpendicularly to the surface. The pitch of the helices is dependent on the composition of the nematic-cholesteric liquid crystal mixture and on the cholesteric material used. Upon applying a voltage having a frequency below the critical frequency across the electrodes, the planar-conical texture changes into a light-scattering focal-conical texture (B) above a certain threshold voltage $V_{th}$, which is shown in FIG. 2c. The axes of the helices turn in a direction parallel to the supporting plates. When the voltage increases still with a frequency below the critical frequency above a certain value $V_3$ the helices unwind and as a result of the positive dielectric anisotropy a transparent homeotropic-nematic texture (C) is formed, as indicated in FIG. 2d. When the voltage decreases slowly, the transparent homeotropic-nematic texture D is maintained to a voltage $V_1 < V_3$, below which voltage $V_1$ (via the line E) the light-scattering focal-conical texture (F) is achieved again. At a voltage $V_2$ having a frequency below the critical frequency, where $V_1 < V_2 < V_3$, the liquid crystal layer may be in a transparent homeotropic-nematic condition, if the voltage starter at a voltage exceeding $V_3$, or may be in a light-scattering focal-conical condition if the voltage started at a voltage smaller than $V_1$. If the liquid crystal layer is in the homeotropic-nematic condition (D) the substantially transparent planar-conical condition (A) can be reached in a very short period of time by the temporary application of a sufficiently large voltage at a frequency above the critical frequency. As a result of the negative dielectric anisotropy occurring above the critical frequency, the homeotropic-nematic texture changes into a planar-nematic textue, as indicated in FIG. 2e. During the presence of this field, the helices wind spontaneously again so that after switching off, the substantially transparent planar-conical texture is formed.

The driving of the matrix display device according to the invention will be described by way of example with reference to FIG. 3. A and B denote two row electrodes and C, D and E denote three column electrodes of a matrix display device having n rows. The picture elements are at the crossings of the row and column electrodes. The display device is first erased for which purpose all picture elements are first brought into the homeotropic-nematic condition by applying a voltage $V_A$ having a frequency below the critical frequency to the column electrodes and a voltage $V_B$ having a frequency below the critical frequency to the row electrodes, which is shown in FIG. 3a by means of circles. The overall voltage $V_A + V_B$ is larger than the voltage $V_3$ denoted in FIG. 2a. For the given layer thickness of 10 μm and the cholesteric liquid crystal used, the voltage $V_A = 17$ $V_{rms}$, 50 Hz and $V_B = -8$ $V_{rms}$ 50 Hz, which voltages should be maintained for erasing for two seconds. The voltage $V_A$ corresponds to the voltage $V_2$ indicated in FIG. 2. The row electrode A is then driven with a voltage $+V_A$ and the information is written on the column electrodes C, D and E by a voltage alternately $+V_A$ and $-V_A$. In the example, approximately 60 ms was necessary for writing. The picture elements across which there is an overall voltage 0, come in the focal-conical condition and become light-scattering. In FIG. 3b these elements are denoted by dots. The picture elements across which there is a voltage of 2 $V_A$, remain in the transparent homeotropic nematic condition. In this manner all rows are successively provided with information. A voltage $V_C$ having a frequency above the critical frequency is then applied across all elements, which is shown in FIG. 3c. In the example described a voltage $V_C = +20$ $V_{rms}$, 30 kHz was applied for 600 ms. As a result of this the homeotropic-nematic condition of the transparent picture elements changes into the planar-nematic condition. During the presence of the voltage the helices wind spontaneously so that after switching off the voltage the substantially transparent planar-conical condition is formed. The high frequency alternating voltage $V_C$ does not substantially influence the focal-conical condition of the light-scattering picture elements. After switching off the voltage the information remains visible for a very long period of time, in the given example longer than a few days.

FIGS. 4a and 4b show diagrammatically the variation of the overall voltage across a light-scattering and a transparent element, respectively, as a function of the time during the driving described with reference to FIG. 3. The voltages having a frequency below the critical frequency are shown in solid lines and the voltages having a frequency above the critical frequency are denoted by broken lines. In these figures, $t_w$ is the time required for writing the information per row and $n \times t_w$ is the time required for writing n rows.

What is claimed is:

1. An electro-optic liquid crystal matrix display device comprising:
   two parallel supporting plates,
   patterns of strip-shaped electrodes crossing each other on facing surfaces of said supporting plates to form a matrix of display elements at said crossings,
   a layer of cholesteric liquid crystal between said facing surfaces and having a positive dielectric anisotropy,
   wherein said layer has at least one of a substantially transparent planar-conical texture or a light-scattering focal-conical texture below a first field strength $E_1$, a transparent homeotropic-nematic texture above a second field strength $E_2$, and at least one of a light-scattering focal-conical texture or a transparent homeotropic-nematic texture at field strengths between $E_1$ and $E_2$, such that said liquid crystal exhibits hysteresis upon application of voltage to said device,
   wherein said liquid crystal has a negative dielectric anisotropy above a critical frequency of said electric field, such that said liquid crystal combines hysteresis with dielectric anisotrophy inversion,
   means for applying an electric field at a frequency below said critical frequency over each display element to provide said transparent homeotropic-nematic texture in said display elements,
   means for applying display signals to at least selected display elements to provide said light-scattering focal-conical texture in said selected display elements, wherein non-selected display elements remain in said transparent homeotropic-nematic texture, and
   means for applying an electric field at a frequency above said critical frequency over said non-selected display elements to provide said transparent planar-conical texture in said non-selected display elements, said selected display elements remaining in said light-scattering focal-conical texture.

2. A display device according to claim 1, wherein said facing surfaces of said supporting plates have a homeotropic surface orientation.

3. A display device according to claim 2, wherein said facing surfaces are treated with a solution of perfluorosilane in hexane.

4. A display device according to claim 2, wherein said cholesteric liquid crystal has a pitch smaller than substantially one fifth of the thickness of said layer.

5. A display device according to claim 4, wherein said cholesteric liquid crystal is composed of a nematic liquid crystal mixture including 50% by weight of 4-n-pentylphenyl 2-chloro-4-(4-n-pentyl-benzoyloxy) benzoate and 50% by weight of 4-n-octyl-phenyl-2-chloro-4-(4-n-heptylbenzoyloxy) benzoate to which mixture 5% by weight of a cholesteric liquid crystal, namely 4-cyano-4'-(2-methylbutyl) biphenyl, has been added.

6. A display device according to claim 1, wherein said cholesteric liquid crystal has a pitch smaller than substantially one fifth of the thickness of said layer.

7. A display device according to claim 6, wherein said cholesteric liquid crystal is composed of a nematic liquid crystal mixture including 50% by weight of 4-n- pentylphenyl 2-chloro-4-(4-n-pentyl-benzoyloxy) benzoate and 50% by weight of 4-n-octyl-phenyl-2-chloro-4-(4-n-heptylbenzoyloxy) benzoate to which mixture 5% by weight of a cholesteric liquid crystal, namely 4-cyano-4'-(2-methylbutyl)biphenyl, has been added.

8. A display device according to claim 1, wherein said cholesteric liquid crystal is composed of a nematic liquid crystal mixture including 50% by weight of 4-n-pentylphenyl 2-chloro-4-(4-pentyl-benzoyloxy) benzoate and 50% by weight of 4-n-octyl-phenyl-2-chloro-4-(4-n-heptylbenzoyloxy) benzoate to which mixture 5% by weight of a cholesteric liquid crystal, namely 4-cyano-4'-(2-methylbutyl) biphenyl, has been added.

* * * * *